Patented May 4, 1937

2,079,403

UNITED STATES PATENT OFFICE 2,079,403

REDUCTION OF ACYLOINS

Virgil L. Hansley, Niagara Falls, N. Y., assignor to E. I. du Pont de Nemours & Company, Wilmington, Del., a corporation of Delaware No Drawing. Application December 5, 1933, Serial No. 701,052

20 Claims. (Cl. 260—156.5)

This invention relates to the reduction of acyloins to glycols, and more particularly to the reduction of acyloins derived from high molecular weight fatty acids.

An object of my invention is the production of a series of new compounds having high molecular weights which are symmetrical dialkyl derivatives of ethylene glycol. A further object is to provide an improved method for reducing acyloins to glycols. Other objects will be apparent from the following description of my invention.

Acyloins of fatty acids may be made by reacting fatty acid esters with an alkali metal and hydrolyzing the resulting alkali metal compounds. The reaction may be represented by the following equations:

(1) 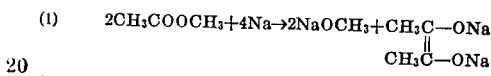

(2) 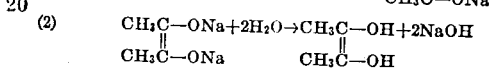

(3) 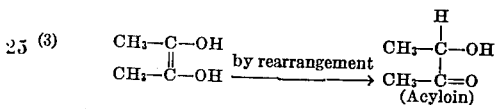

The known methods for preparing acyloins by reacting esters with sodium according to the above equations have proved to be unsatisfactory for making the acyloins of the higher fatty acids, e. g. acids having 12 or more carbon atoms. In my co-pending application, Serial No. 687,485, I have described and claimed a method of applying the above-mentioned acyloin reaction to the esters of the higher fatty acids which results in good yields of the desired products. Briefly stated, this improved method comprises reacting the ester with sodium or other alkali metal at a temperature above the melting point of the metal and using as reaction medium a solvent which readily dissolves the intermediate sodium compound. Suitable solvents include toluene and xylene. The reaction is preferably carried out by dispersing sodium in one portion of the solvent, dissolving the ester in another portion and slowly adding the ester solution to the sodium suspension with agitation at a temperature of 100 to 110° C. After the ester-sodium reaction is complete, the reaction product is hydrolyzed and the resulting acyloin is recovered. I prefer first to decompose any unreacted sodium by adding methanol equivalent to about one-half the sodium originally employed and then to add a slight excess of about 4.5 molar sulfuric acid to complete the hydrolysis. The reaction mixture then is washed with water to remove sulfate and excess acid. The resulting xylene solution is concentrated to one-half to one-third of its volume and cooled to around 0° C. for about one hour, whereupon the acyloin is precipitated in crystalline form.

I have discovered that the acyloins made from the higher fatty acid esters may be readily reduced to produce high molecular weight symmetrical dialkyl derivatives of ethylene glycol which are solids at ordinary temperatures. These novel substances are formed in two modifications which I believe to be stereoisomers, these isomers differing mainly in their melting points. As explained below, by suitably modifying the conditions of reduction I am able to control the yield of either modification.

One method of reducing the higher fatty acid acyloins in accordance with my invention is to dissolve the acyloins in a low molecular weight alcohol, e. g. amyl alcohol, and add thereto an alkali metal or an alkali metal amalgam. I prefer, however, to reduce the acyloins by reacting them with hydrogen under pressure in the presence of a hydrogenating catalyst. This method permits better control of the reduction in order that the yield of the desired stereoisomeric modification may be controlled. I believe that the higher melting stereoisomers are the racemic forms of the glycols while the lower melting stereoisomers are the meso form. Hereinafter, the higher melting stereoisomers will be referred to as the racemic form and the lower melting ones as the meso form, although it is understood that my invention in no way is restricted by this hypothesis. I have found that by varying the temperature at which the acyloins are reduced, the proportion of racemic and meso forms of the glycol in the resulting product may be varied at will. As the temperature of reduction is increased, the proportion of the meso glycol produced is correspondingly increased; if the reduction is carried on at a sufficiently high temperature the reduction product may consist substantially wholly of the meso form. On the other hand, as the reduction temperature is decreased, the product will contain more of the racemic form than the meso.

Reduction of the acyloins by catalytic hydrogenation rather than by means of alkali metal and alcohol is especially desirable when it is desired to prepare the racemic glycols. I have found that the alkali metal reduction usually results chiefly in the formation of the meso or low melting glycols, even when carried out at low temperatures, e. g., below 20° C.

In reducing acyloins by catalytic hydrogenation in accordance with my invention, the various catalysts known to be suitable for hydrogenation of organic compounds may be utilized, for example, various heavy metals and their oxides or salts. I have obtained good results, for example, by using as hydrogenating catalysts platinum oxide and reduced nickel. Likewise the hydrogen partial pressure used in the catalytic hydrogenation may vary as is usual in the catalytic hydrogenation of organic substances. As in other organic hydrogenations, the rate of hydrogenation and yield of hydrogenated product will be favored by an increase in the hydrogen partial pressure.

I am aware that heretofore acyloins have been reduced to the corresponding glycols; however, such prior reductions have been accomplished only by means of alkali metal-alcohol reductions. So far as I am aware, it has not heretofore been proposed to reduce acyloins by reaction with hydrogen in the presence of a hydrogenating catalyst. Furthermore, it has not been proposed heretofore to reduce acyloins having more than 12 carbon atoms in the molecule, nor have symmetrical dialkyl derivatives of ethylene glycol been heretofore described having more than 16 carbon atoms in the glycol molecule. I have discovered that solid, symmetrical dialkyl ethylene glycols containing more than 16 carbon atoms per molecule may be prepared by the reduction of the corresponding acyloins.

In one method of reducing acyloins to glycols by hydrogenation in accordance with my invention, the acyloin is dissolved in a suitable solvent to produce a liquid which is readily agitated and suitable amounts of a hydrogenation catalyst, preferably reduced nickel, is added to the solution. The solution containing the catalyst then is contacted with hydrogen under a pressure of from 10 to 75 atmospheres at a suitable temperature, for example, around 100° C., with agitation. The hydrogenation reaction ordinarily requires 2 to 5 hours for completion. If it is desired to produce preponderantly the low melting or meso form of the glycol, the reaction temperature preferably is maintained between 175° C. and 250° C., depending upon the particular acyloin being reduced. If desired, a higher hydrogenation temperature may be used, but above around 250°, there is a tendency towards thermal decomposition. If the higher melting glycol is desired, the reaction temperature is maintained below about 100° C., preferably at around 20 to 25° C.

By the reduction of acyloins of higher fatty acids as described above, I have prepared and isolated a number of new glycols, as follows:

| Acyloin of fatty acid | Glycol |
|---|---|
| Caprylic | Sym.-diheptyl ethylene glycol ($C_{16}H_{32}(OH)_2$). |
| Lauric | Sym.-diundecyl ethylene glycol ($C_{24}H_{48}(OH)_2$). |
| Myristic | Sym.-ditridecyl ethylene glycol ($C_{28}H_{56}(OH)_2$). |
| Stearic | Sym.-diheptadecyl ethylene glycol ($C_{36}H_{72}(OH)_2$). |

My invention may be further illustrated by the following examples:

*Example 1*

An 8.4 gram quantity of the acyloin from lauric acid was catalytically reduced by means of a $PtO_2$ catalyst (Organic Synthesis Collective, vol. I, p. 452) in cyclohexane solution at 20-25° C. and with hydrogen at a pressure of substantially one atmosphere. The absorption of hydrogen was complete in seven hours, during which time, the theoretical amount of hydrogen had been absorbed. By fractional crystallization 5.6 grams (66.5% yield) of the racemic or high melting form of sym.-diundecyl ethylene glycol, M. P. 123–124° C. was obtained. From the mother liquor 2.5 grams (29.8% yield) of the low melting modification, M. P. 60–80° C. was obtained. This low melting form was apparently an equi-molecular mixture of the meso and racemic forms.

*Example 2*

A 25 gram quantity of the acyloin from methyl laurate was reduced with sodium in amyl alcohol solution at about 60° C. After neutralizing the alkaline reaction product the crude glycol was recovered and recrystallized from a 1:1 mixture of toluene and alcohol. The reaction product consisted mainly of the low melting modification described in Example 1. However, by fractional crystallization an 8.6 gram (35%) portion of the reduction product was obtained melting at 92–96° C. which would indicate the presence of the racemic or high melting form.

*Example 3*

A larger quantity, 125 grams, of the acyloin from lauric acid was dissolved in 1250 c. c. of alcohol in an autoclave and subjected to 75 atmospheres hydrogen pressure in the presence of 15 grams of a reduced nickel catalyst at 150° C. Hydrogen absorption was complete after 5 hours. The analysis of the mixture of isomeric glycols, as in Example 1, showed 62.3 grams (49.8%) of the high melting or racemic form, M. P. 123–125° C. and 54.7 grams (47.2%) of the low melting mixture of meso and racemic glycols, M. P. 70–85° C. Ten grams of this low melting mixture of glycols were converted to the acetate by refluxing for 10 minutes with 15 gms. of acetic anhydride with 2 gms. of sodium acetate as catalyst. The excess anhydride was decomposed with methanol and the ester washed free of acetic acid with water and then dried. The saponification equivalent of this ester, without further purification was found to be 241. Saponification equivalent calculated for the diacetate, 226, for the monoacetate of the acyloin mother substance, 410. The recrystallized racemic form of the glycol of M. P. 123–124° C. gave a diacetate of M. P. 44–46° C. which had a saponification equivalent of 225.

*Example 4*

Another 128.4 grams of acyloin from lauric acid was catalytically reduced as in Example 3 with a reduced nickel catalyst except that a temperature of 100° C. was employed. The mixture of isomeric glycols in this case analyzed 74.6 grams (59.5%) racemic form melting at 122–124° C. and 52.0 grams (40.5%) meso and racemic mixture, M. P. 70–90° C.

*Example 5*

Lauric acid acyloin, 414 grams, was hydrogenated in 1500 c. c. of hexahydroxylene by means of 7.5 grams of reduced nickel catalyst and approximately 75 atmospheres of hydrogen pressure in several stages and at several different temperatures. Between each stage the entire reduction product was isolated and its melting point range determined as an index of the relative amounts of meso and racemic forms of the glycol present. The results of this series of hydrogenations at various temperatures are shown in the following table. The duration of each hydrogenation was 12 hours and the amount of nickel catalyst used was 7.5 grams in each hydrogenation.

| Hydrogenation number | Temperature of reduction | M. P. of whole product |
|---|---|---|
| 1 | 160° C. | 96–110 |
| 2 | 180° C. | 91–116 |
| 3 | 210° C. | 76–109 |
| 4 | 248° C. | 66– 72 |

The diacetate was prepared from 20 grams of the material obtained from the 4th hydrogenation, as in Example 3. Saponification value: found, 248; calculated for the diacetate of sym.-diundecyl ethylene glycol, 226; for the corresponding acyloin, 410.

Example 6

Two hundred grams of the acyloin from methyl myristate were catalytically reduced in 1000 c. c. of hexahydroxylene as the solvent with 15 grams of nickel catalyst and 100 atmospheres hydrogen pressure at 100° C. The yield of the racemic or high melting form of the sym.-ditridecyl ethylene glycol was 106 grams (52.8%), M. P. 121–123° C. The remainder of the product was the inseparable mixture of the meso and racemic forms which melted at 86–106° C.

Example 7

The acyloin from caprylic acid was catalytically reduced as in Example 3 above. The resulting racemic form of the sym. diheptyl ethylene glycol melted at 129–130° C.

Example 8

113 grams of the acyloin from stearic acid were hydrogenated in 1000 c. c. of ethanol and with 20 grams of nickel catalyst at 100 atmospheres pressure and a temperature of 100° C. The sym. diheptadecyl ethylene glycol isomeric mixture was the most insoluble of all of the glycols described herein. 6.5 grams of the racemic form were separated by fractional crystallization in a pure form; M. P. 122–124° C. The remainder of the glycol melted at 79–110° C. which would indicate a preponderance of the racemic form in the low melting mixture of meso and racemic forms.

Example 9

An acyloin mixture (125 grams) prepared from a mixture of 60 parts by weight of methyl laurate and 40 parts of methyl myristate was reduced by catalytic hydrogenation, using a reduced nickel catalyst as in Example 4 at 100° C. Fifty-nine grams (47%) of the high melting or racemic form of the mixed glycol, M. P. 115–119° C., and 43.0 grams of the low melting form, M. P. 72–85° C. (42%) were obtained.

The novel products made in accordance with my invention are symmetrical dialkyl derivatives of ethylene glycol having 18 or more carbon atoms per molecule. The racemic or high melting modifications of the glycols having from 18 to 36 carbon atoms per molecule melt at 120 to 130° C., while their meso forms may melt as low as 60° C. The racemic form substantially free from the meso form may be separated by fractional crystallization of the crude product obtained by the acyloin reduction. This is preferably done by dissolving the reduction product in an aromatic hydrocarbon or a mixture of aromatic hydrocarbons, e. g. toluene and benzene, at an elevated temperature and cooling to effect crystallization. The mother-liquor will contain a mixture of the racemic and meso forms. When it is desired to produce the pure racemic form, I prefer to reduce the corresponding acyloin at such temperature that a minimum quantity of the meso form is produced. If the meso form is desired in a substantially pure state, it is preferable to carry out the reduction at a temperature sufficiently high to prevent the formation of substantial amounts of the racemic form.

The novel glycols prepared by my herein described invention are white, crystalline, wax-like substances characterized by having a low degree of solubility in aromatic hydrocarbons and aliphatic alcohols in the cold but fairly soluble in these solvents at elevated temperatures, e. g. around 60 to 100° C. In general, they are more soluble in the aromatic hydrocarbons than in alcohols and the solubilities in these solvents are in general greater for the glycols having the lower molecular weights. These glycols are substantially insoluble in water, slightly soluble in benzene and acetone and quite soluble in chlorinated hydrocarbons, e. g., chloroform, carbon tetrachloride and trichlorethylene. The acyloins from which these products are made, by the herein described methods, may be prepared from the pure fatty acids, their esters or the natural products containing fatty acids and/or esters, or glycerides, e. g., animal and vegetable oils. For example, a vegetable oil or animal oil containing glycerides of higher fatty acids may be converted into a mixture of methyl esters of the fatty acids present using sodium methylate as catalyst. These esters then may be separated by fractional distillation and the esters separately reacted with alkali metal and hydrolysis to form the acyloins, or the mixture of esters may be converted into a mixture of the respective acyloins. The acyloins or acyloin mixture then may be reduced in accordance with my invention to produce glycols or glycol mixtures.

The herein described novel glycols also may be prepared from fatty acid esters without intermediate isolation of the acyloins. For example, an ester may be reacted with 2 atoms of sodium per mole of ester as in the first step of the acyloin preparation. When this reaction is complete an excess of alcohol is added to the reaction mixture, together with sufficient sodium to act as reducing agent. The alcohol serves to hydrolyze the acyloin intermediate to acyloin and, in conjunction with the added sodium, to furnish the hydrogen required to reduce the acyloin to glycol.

The herein described novel glycols may be reacted with fatty acids and acid anhydrides to produce the corresponding esters. These novel esters are characterized by having relatively low melting points, for example in the range of 30 to 70° C., and are wax-like crystalline substances.

One method of esterifying the glycols in accordance with my invention by means of the acid anhydride of the ester desired will be described by way of example. The glycol is refluxed for 10 to 30 minutes with a slight excess of the anhydride and with a small amount of the sodium salt of the acid in question as catalyst. The excess anhydride is decomposed by boiling with methanol and then the ester is washed free of organic acid with water and dried. The yield of ester is substantially quantitative and the ester is as pure as the glycol from which it was prepared. The glycol esters can be recrystalized from methanol or a mixture of methanol and ethyl ether or other solvents to obtain them in a crystalline or powder form.

Several esters were prepared as follows:

Example 10

Two grams of the high melting form of the sym. diundecyl ethylene glycol of M. P. 123-124° C., one gram of sodium acetate and 15 grams of acetic anhydride were mixed together and heated gently for ten minutes at the refluxing temperature of the anhydride. The excess anhydride was decomposed with methanol and the ester solidified by cooling. The solid ester was washed with water and crystallized from pure methanol. The crystallized ester melted at 44-45° C. Its saponification equivalent was 227; calculated for the diacetate, 226.

Example 11

18.5 grams of the sym. diundecyl ethylene glycol and 28.5 grams of stearic acid were heated to 200° C. in a stream of $CO_2$ to remove the water formed during esterification. The resulting ester was crystallized from n-heptane; M. P. of ester, 28-30° C.; saponification equivalent of ester 670; calculated for the monostearate, 636.

Example 12

A number of esters of the herein described glycols were prepared by the method illustrated by Example 10, as follows:

| Glycol | Ester | Melting point | Saponification equivalent | |
|---|---|---|---|---|
| | | | Found | Calculated |
| Sym.-ditridecyl ethylene glycol | Diacetate | 51.5-52.0° C. | | |
| Sym.-diundecyl ethylene glycol (M. Pt. 70-85° C.) | Diacetate | 34.0-34.5° C. | 241 | 226 |
| Sym.-diheptadecyl ethylene glycol | Diacetate | 65.0-66.0° C. | | |
| Sym.-diundecyl ethylene glycol (racemic) | Dipropionate | 35.0-36.0° C. | 228 | 241 |
| Sym.-diundecyl ethylene glycol (mixt. of racemic+meso forms from hydrogenation of acyloin at 100° C.) | Diacetate | 38.0-39.5° C. | | |
| Sym.-diundecyl ethylene glycol (mixt. of racemic and meso forms from hydrogenation of acyloin at 150° C.) | Diacetate | 36.5-38.0° C. | | |
| Mixed glycol of Example 9 | Diacetate | 29.0-38.0° C. | | |

I claim:

1. A process for producing high molecular weight glycols comprising subjecting an acyloin of a fatty acid to the action of hydrogen under pressure in the presence of a hydrogenation catalyst while controlling the reaction temperature to predetermine the ratio of the stereoisomers in the resulting glycol product.

2. A process for producing a high molecular weight glycol comprising subjecting an acyloin of a fatty acid to the action of hydrogen under pressure in the presence of a reduced nickel catalyst while controlling the reaction temperature to predetermine the ratio of the stereoisomers in the resulting glycol product.

3. A process for producing the low-melting stereoisomer of a high molecular weight glycol comprising subjecting an acyloin of a fatty acid having more than 12 carbon atoms per molecule to catalytic hydrogenation at a temperature of about 175° C. to 250° C.

4. A process for producing a high molecular weight glycol comprising subjecting an acyloin of a fatty acid having more than 12 carbon atoms per molecule to the action of hydrogen under pressure in the presence of a reduced nickel catalyst while controlling the reaction temperature in the range of about 20-250° C. to predetermine the ratio of the stereoisomers in the resulting glycol product.

5. A process for producing the high-melting stereoisomer of a high molecular weight glycol comprising subjecting an acyloin of a fatty acid having more than 12 carbon atoms per molecule to catalytic hydrogenation at a temperature below about 100° C.

6. A process for producing the high-melting stereoisomer of a high molecular weight glycol comprising subjecting an acyloin of a fatty acid having more than 12 carbon atoms per molecule to the action of hydrogen under pressure in the presence of a reduced nickel catalyst at a temperature of around 20° C.

7. A process for producing the high melting stereoisomer of a high molecular weight glycol comprising subjecting the acyloin of lauric acid to the action of hydrogen under pressure in the presence of a reduced nickel catalyst at a temperature of 20° C. to 100° C.

8. A process for producing the high melting stereoisomer of a high molecular weight glycol comprising subjecting the acyloin of myristic acid to the action of hydrogen under pressure in the presence of a reduced nickel catalyst at a temperature of 20° C. to 100° C.

9. A process for producing the high melting stereoisomer of a high molecular weight glycol comprising subjecting the acyloin of stearic acid to the action of hydrogen under pressure in the presence of a reduced nickel catalyst at a temperature of 20° C. to 100° C.

10. A symmetrical dialkyl ethylene glycol having more than 16 carbon atoms per molecule.

11. A symmetrical dialkyl ethylene glycol having at least 24 carbon atoms per molecule and having a melting point in the range 60 to 130° C.

12. A symmetrical dialkyl ethylene glycol having at least 24 carbon atoms per molecule having a melting point in the range 120 to 130° C.

13. A symmetrical dialkyl ethylene glycol having 24 to 36 carbon atoms per molecule.

14. As a new compound, symmetrical diundecyl ethylene glycol.

15. As a new compound, symmetrical ditridecyl ethylene glycol.

16. As a new compound, symmetrical diheptadecyl ethylene glycol.

17. In a process for producing stereoisomeric glycols by reduction of a high molecular weight acyloin, a method for predetermining the ratio of stereoisomers in the product comprising carrying out the reduction reaction at a temperature not higher than 100° C. to produce mainly the high melting stereoisomer and employing reduction temperatures higher than 100° C. to produce mainly the low-melting stereoisomer.

18. In a process for producing stereoisomeric glycols by catalytic hydrogenation of a fatty acid acyloin having at least 12 carbon atoms per molecule, a method for predetermining the ratio of stereoisomers in the product comprising maintaining the hydrogenation temperature below about 100° C. to produce mainly the high melting stereoisomer and maintaining said temperature at not lower than about 175° C. to produce mainly the low melting stereoisomer.

19. In a process for producing stereoisomeric glycols by catalytic hydrogenation of a fatty acid acyloin having at least 12 carbon atoms per molecule, a method for predetermining the ratio of stereoisomers in the product comprising maintaining the hydrogenation temperature at about 20 to 30° C. to produce mainly the high melting stereoisomer and maintaining said temperature at about 175 to 250° C. to produce mainly the low melting stereoisomer.

20. A composition of matter comprising a mixture of the stereoisomeric forms of symmetrical dialkyl ethylene glycols prepared by catalytic hydrogenation of a mixture of the acyloins of lauric and myristic acids.

VIRGIL L. HANSLEY.